United States Patent [19]

Godard et al.

[11] 4,297,629

[45] Oct. 27, 1981

[54] AUTOMATIC SWITCHING ARRANGEMENT FOR TWO BATTERIES WHICH ARE CHARGED IN PARALLEL AND DISCHARGED IN SERIES

[75] Inventors: Pierre Godard, Tremblay les Gonesse; Michel Billot, Drancy, both of France

[73] Assignee: Saft-Societe des Accumulateurs Fixes et de Traction, Romainville, France

[21] Appl. No.: 136,355

[22] Filed: Apr. 1, 1980

[30] Foreign Application Priority Data

Apr. 13, 1979 [FR] France ................ 79 09469
Dec. 6, 1979 [FR] France ................ 79 29942

[51] Int. Cl.³ .............................................. H02J 7/04
[52] U.S. Cl. ...................................... 320/7; 320/16; 307/66
[58] Field of Search ............ 320/6, 7, 16; 307/46, 307/66

[56] References Cited

U.S. PATENT DOCUMENTS 4,114,082 9/1978 Scheidler .................... 320/7
4,139,812 2/1979 Huggins .

FOREIGN PATENT DOCUMENTS 1210406 3/1960 France .
1505032 12/1966 France .
2139769 1/1973 France .
1428661 3/1976 United Kingdom .

*Primary Examiner*—J. D. Miller
*Assistant Examiner*—John W. Redman
*Attorney, Agent, or Firm*—Kenyon & Kenyon

[57] ABSTRACT

The invention relates to an automatic switching arrangement for two batteries which are charged in parallel and discharged in series. The arrangement includes a control unit and a charging circuit; the control unit is a circuit which includes a transistor (T1), a resistor (R1) and a diode (D1) which is connected between two terminals of opposite polarities of the batteries (BT1) and (BT2), the transistor being blocked or conductive according to the direction of the voltage at the terminals of the diode; the transistor controls switching units (T2,T3) of the charging circuit. A switch (CT4, Th, CT11) can be disposed in series with the diode (D1). Application to stand-by batteries.

15 Claims, 7 Drawing Figures

AUTOMATIC SWITCHING ARRANGEMENT FOR TWO BATTERIES WHICH ARE CHARGED IN PARALLEL AND DISCHARGED IN SERIES

The present invention relates to an automatic switching arrangement for two batteries which are charged in parallel and discharged in series. It applies particularly, but not exclusively, to batteries which provide an emergency source of current for a load such as video tape-recording equipment or an aircraft electricity supply, said batteries being charged by a constant-voltage source which simultaneously feeds the load.

BACKGROUND TO THE INVENTION

In such a case, it is necessary for the voltage of the source and the voltage of the battery when discharging to be practically equal, since they feed the load alternately. This poses a problem for charging the battery and in particular when it is of a type which it is preferable to charge at a constant current rather than at a constant voltage. This is the case, for example, with sealed nickel-cadmium batteries.

The preferred way of solving the problem is to divide the battery into two parts which are charged in parallel but which are discharged in series so that the voltage supplied by the electricity supply is always higher than the voltage across the batteries during charging.

Particularly for vehicle engine-starting applications, arrangements are already known in which batteries are charged in parallel and discharged in series. This is the case, for example, of the system described in U.S. Pat. No. 2,671,978. Most of these systems operate manually under the control of a knob which is operated by the driver.

French Pat. No. 1 505 032, more particularly, describes an arrangement which operates automatically; however, it relates to an arrangement in which the terminals between which the charger is connected and those to which the load is connected are distinct. The automatic device described in British Pat. No. 1 428 661 has pairs of common terminals, but it has the disadvantage of high permanent power consumption, the charging resistors remaining permanently connected.

AIM OF THE INVENTION

The present invention aims to provide an arrangement in which the battery circuit is switched automatically and in which the load and feed terminals are common and have negligible consumption.

SUMMARY OF THE INVENTION

It provides an automatic switching arrangement for connecting two batteries in parallel between a pair of power supply leads for charging and in series between the same power supply leads for discharging to supply power thereto in the event of a failure of a power supply to the said leads, the switching arrangement comprising:

positive and negative terminals for respective connection to said power supply leads;
first and second storage batteries, the negative pole of the first battery being connected to the negative terminal and the positive pole of the second battery being connected to the positive terminal;
first and second switchable charging circuits, the first switchable charging circuit being connected between the positive pole of the first battery and the positive terminal, and the second switchable charging circuit being connected between the negative pole of the second battery and the negative terminal;
unidirectionally conductive means connected in series between the positive pole of the first battery and the negative pole of the second battery in order to allow a discharge current to flow in series through the batteries but to prevent a charging current from flowing in series through the batteries; and
control means arranged to switch on said first and second switchable charging circuits when there is sufficient externally applied voltage at the positive and negative terminals for the batteries to be charged therefrom, and to switch off said switchable charging circuits otherwise to enable the batteries to supply power in series to said positive and negative terminals;
the control means including a first transistor connected to be turned on and off by the direction of the potential difference between the positive pole of the first battery and the negative pole of the second battery, and positive feedback means arranged to saturate the first transistor when it turns on.

The unidirectionally conductive means is usually constituted by a diode, but may be a thyristor or other switchable device, and may be connected in series with a switch.

When the batteries are slightly discharged and voltage is applied to the positive and negative terminals, the unidirectionally conductive means is reverse-biassed. The first transistor is biassed by the voltage appearing across the unidirectionally conductive means and becomes conductive and the positive feedback effect (supplied by a resistor) saturates the first transistor which controls the switchable charging circuits which become conductive and cause the batteries to be charged in parallel.

If the terminals are no longer supplied with current, the two batteries discharge into the terminals and the unidirectionally conductive means allows current to pass between the two batteries which it connects in series. The first transistor is turned off and sets the switchable charging circuits in the non-conductive state.

The switchable charging circuits may be of the electronic kind (e.g. transistors) or of the mechanical kind (relay contacts). A timing unit may be associated thereto to limit the charging time.

The first transistor is connected so as to be turned off when the batteries are discharging, i.e. when the positive pole of the first battery is at a positive potential with respect to the negative pole of the second battery.

In a first embodiment, the first switchable charging circuit includes a second transistor and that the second switchable charging circuit includes a third transistor, the second transistor being connected so as to be controlled by the third transistor.

In one variant, the first switchable charging circuit is constituted by a second transistor and the second switchable charging circuit is constituted by a timing unit such as a counter.

In another variant, the first switchable charging circuit is constituted by first contacts of a relay whose energization is controlled by the first transistor and the second switchable charging circuit is constituted by second contacts of said relay.

In the above-described arrangement, the unidirectionally conductive means is the main component which allows the circuit to be switched from the charging state to the discharging state and vice-versa. However, using a diode for this purpose limits the application of the arrangement. Indeed, when a constant-voltage charger is available which is usual for recharging lead-acid storage cells, it cannot be used to charge alkaline storage cells at a voltage higher than half the sum of the charger voltage during charging added to the diode voltage drop (0.7 V). Therefore, with a charger which supplies 13.1 V when charging, the batteries cannot be charged at more than $(13.1+0.7)/2=6.9$ V. Therefore, if it is required to increase the maximum charging value of the batteries, it is necessary to change the charger. This is not desirable for already existing installations. That is why the invention also relates to diverse variants which allow batteries to be charged at a voltage higher than the above-mentioned limit voltage.

These variants include switch means associated with said unidirectionally conductive means between the batteries, the switch means being controlled by means which cause it to open and therefore to interrupt the current through the unidirectionally conductive means when the batteries are being charged and which cause it to close, thereby re-establishing the current through the unidirectionally conductive means when the batteries are being discharged.

In a first embodiment, said switch means is constituted by relay contacts disposed in series between the negative pole of the second battery and the unidirectionally conductive means, the excitation winding of the relay being connected between the positive terminal and the negative terminal that is said contacts are closed when its winding is not excited.

In a second embodiment, the first switchable charging circuit is constituted by first contacts of a relay whose excitation is controlled by the first transistor and wherein the second switchable charging circuit is constituted by second contacts of said relay, said switch means is constituted by third contacts of the said relay which connects the batteries in series with the unidirectionally conductive means when the relay is not excited and which connects the negative pole of the second battery to the negative terminal when the relay is excited.

In a third embodiment, the unidirectionally conductive means and said switch are constituted by a thyristor whose trigger electrode is connected to the point which is common to two resistors which, with a Zener diode, constitute a series circuit disposed in parallel with the thyristor and a Zener diode (DZ). The thyristor becomes blocked when a reverse voltage is applied to its terminals at the end of discharge of the batteries. This switches the batteries from the series connection to the parallel connection.

In a fourth embodiment, the switch means is constituted by contacts controlled by a relay which is itself controlled by the first transistor whose base is connected to the cathode of the unidirectionally conductive means by a first resistor, said relay actuating the switchable charging circuits via a terminal voltage verification circuit which includes a fourth transistor controlled by the fifth transistor and via a timing circuit which includes a fifth transistor in series with the winding of the relay, the base of the fourth transistor being connected to the fifth transistor by a Zener diode associated with an RC circuit, the state of the terminal voltage being verified by means of two resistors which are connected in series between respective ends of the said first resistor and respective ones of the positive and negative terminals.

BRIEF DESCRIPTION OF THE DRAWINGS

The invention will be better understood from the following examples given with reference to the accompanying drawings in which.

DETAILED DESCRIPTION

Figure 1:
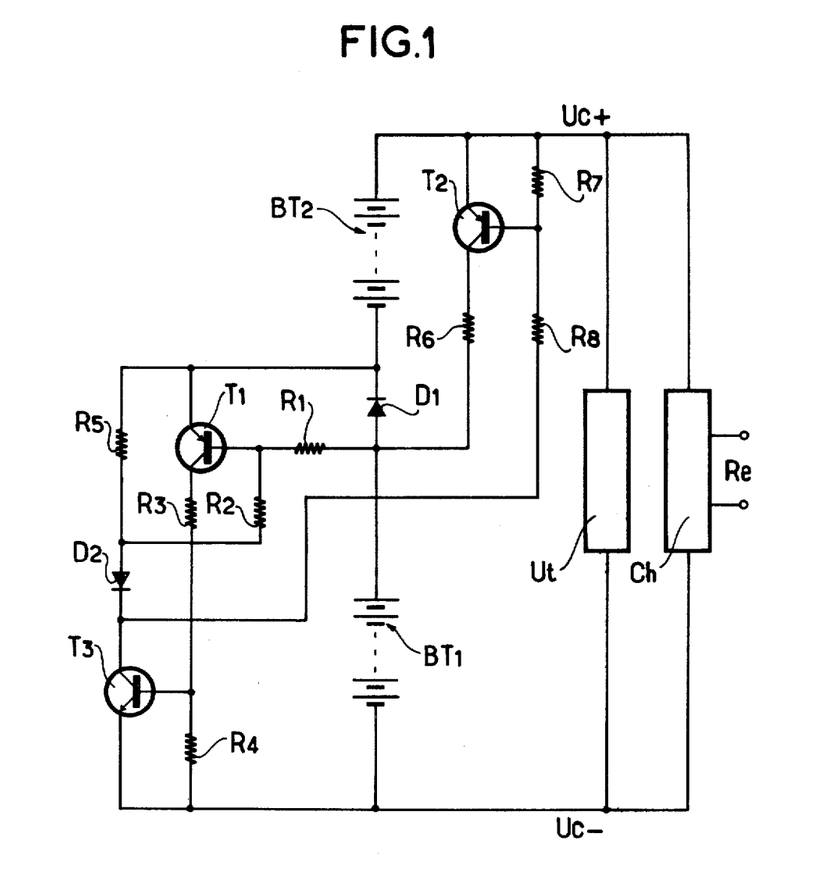
FIG. 1 illustrates schematically a first embodiment of the arrangement in accordance with the invention.

FIG. 1 illustrates two batteries BT1 and BT2 and a diode D1 whose anode is connected to the positive terminal of the battery BT1 and whose cathode is connected to the negative terminal of the battery BT2. The negative terminal of the battery BT1 is connected to a negative terminal UC— which is common to a charging circuit (Ch) and to a load (Ut) fed by the charging circuit in normal conditions. The charging circuit is fed from a main supply Re. The positive terminal of the battery BT2 is connected to a positive terminal UC+ which is common to the charging circuit and to the load. The point which is common to the anode of the diode D1 and to the positive terminal of the battery BT1 is connected via a resistor R1 to the base of a PNP transistor T1 whose emitter is connected to the point which is common to the cathode of the diode D1 and to the negative terminal of the battery BT2. The collector of the transistor T1 is connected via two resistors R3 and R4 to the terminal UC—. The base of an NPN transistor T3 is connected to the point which is common to the resistors R3 and R4, the emitter of said transistor being connected to the terminal UC—.

The negative terminal of the battery BT2 is connected via a resistor R5 and a diode D2 to the collector of the transistor T3, the cathode of the diode D2 being connected to the collector of the transistor T3. A resistor R2 is connected between the base of the transistor T1 and the anode of the diode D2.

The point which is common to the cathode of the diode D2 and to the emitter of the transistor T3 is connected via two resistors R7 and R8 to the terminal UC+. The point which is common to the resistors R7 and R8 is connected to the base of a PNP transistor T2 whose emitter is connected to the terminal UC+ and whose collector is connected via a resistor R6 to the positive terminal of the battery BT1.

The arrangement operates as follows. When the charger (Ch) begins to charge, the reverse voltage across the terminals of the diode D1 biases the transistor T1 which is turned on via the resistor R1, said transistor controlling the transistor T3. The voltage appearing across the resistor R2 increases the bias of the transistor T1 and the transistor T3 becomes saturated. It controls the transistor T2 via the resistor R8 and the two batteries are charged in parallel: BT1 via the circuit UC+, emitter-collector of the transistor T2, R6, BT1, UC−; and T2 via the circuit UC+, BT2, R5, D2, collector-emitter of the transistor T3, UC−.

As long as power is applied to the charger (Ch), the terminals UC+ and UC− supply current to the batteries BT1 and BT2, at least until they reach their end of charge. However, to ensure that charging continues without the batteries feeding power in parallel to the charges, the voltage between UC+ and UC− must not drop below the sum of the voltages across the batteries BT1 and BT2 plus about half the DC voltage drop of the diode D1. That is to say it is not necessary to maintain a reverse voltage across the terminals of the diode D1 to keep the transistor T1 turned on since the resistor R2 continues to bias the transistor T1 by its feed-back effect until about half the forward DC voltage of the diode appears across its terminals.

In the event of a current failure in the charging circuit, the batteries BT1 and BT2 are connected in series by the diode D1 and feed the load circuit. The transistor T1 is reverse biased by the resistor R1. This turns off the three transistors T1, T2 and T3. It is seen that because the transistors are off, while the batteries discharge no current passes through the charging circuits peculiar to each of the batteries.

Of course, the sum of the end of discharge voltages of the batteries less the DC voltage drop across the diode D1 must be an acceptable voltage for the load.

It must also be mentioned that to prevent discharge through the charging circuit, it is only necessary to open circuit the assembly formed by the batteries BT1 and BT2, e.g. by stopping charging but without any load: indeed, discharging into the charging circuit biasses the diode D1 completely and R1 reverse biasses T1 and the charging parts of the assembly are blocked.

It should be noted that it is possible to have the two transistors T2 and T3 each controlled directly by an extra transistor without making any great changes. However, synchronism in the charging of one battery with respect to another is then not so good and this unbalances charging.

Likewise, the diode D2 allows a single transistor with two different potentials to be used. Said diode could be replaced by an extra transistor but this is a more expensive solution.

Figure 2:
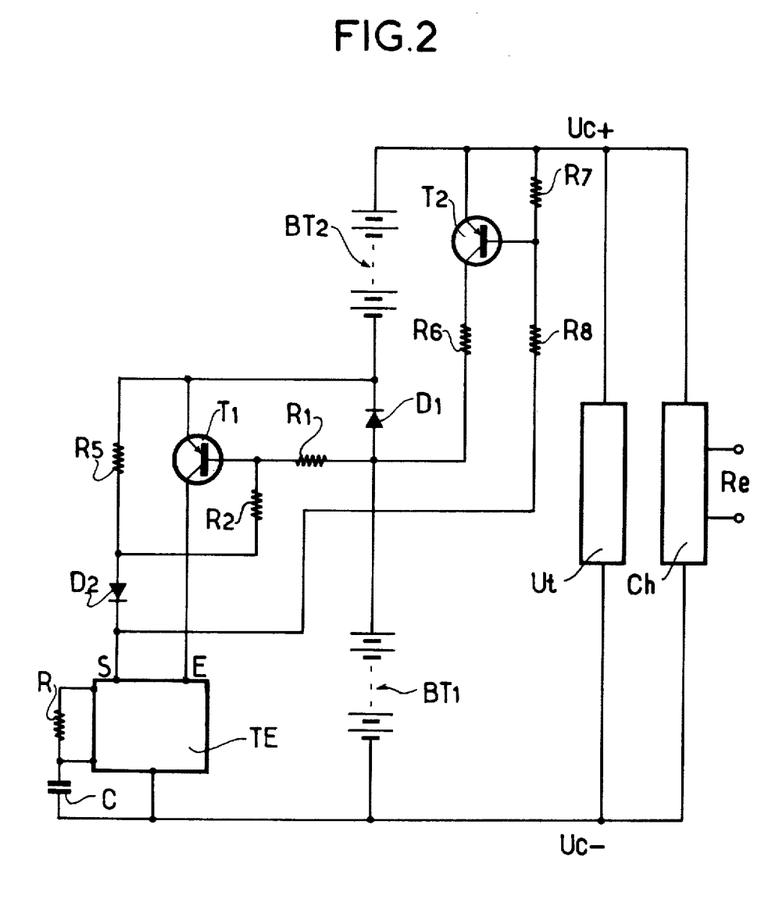
FIG. 2 illustrates schematically a second embodiment of the arrangement in accordance with the invention.

FIG. 2 shows a similar arrangement, with the transistor T3 replaced by a timing circuit.

All the components of the circuit are included in the same disposition except for the transistor T3 and the resistors R3 and R4 which are replaced by a timing circuit TE which includes a counter with 18 to 24 stages and a multivibrator, a resistance R and a capacitance C each of sufficient value to obtain the required charging time are added as external components to the timing circuit. Such a circuit may, for example, be that sold by MOTOROLA under reference No. 14521. The input E of the timing circuit changes to 1 for example when the transistor T1 becomes conductive. Its output S then changes to 0 and the battery BT2 is charged via the timing circuit while the transistor T2 becomes conductive and allows the battery BT1 to be charged. The output S returns to 1 after the time determined by the frequency which is fixed by the values of R and C and by the number of stages in the counter.

If the charging current is not too high, it can pass directly through the counter as illustrated in the figure. Otherwise, it is easy for the output to control a transistor which connects the cathode of the diode D2 to UC−.

Figure 3:
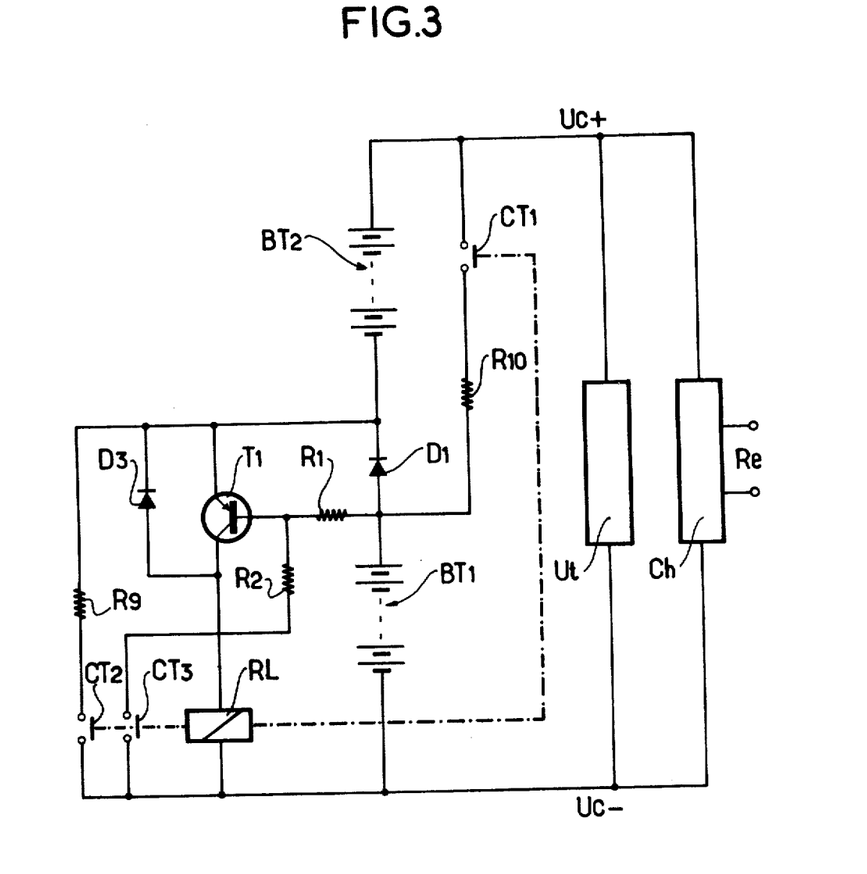
FIG. 3 illustrates schematically a third embodiment of the arrangement in accordance with the invention.

FIG. 3 illustrates another example which can be used in the case where the load requires high voltages and high currents.

FIG. 3 again shows the batteries BT1 and BT2 between which the diode D1 is connected in the same way as in the preceding embodiments. The current of the charging circuit (Ch) passes through the terminals UC+ and UC−, or else battery current goes to the load (Ut) via the same terminals. The figure also shows again the transistor T1 biassed by the resistor R1 as well as the resistor R2.

In contrast, the collector of the transistor T1 is connected to the winding of a relay RL which is itself connected to the terminal UC−. The negative terminal of the battery BT2 is connected via a resistor R9 to a contact CT2 of the relay RL which, when it is closed, connects said negative terminal to the terminal UC−.

The positive terminal of the battery BT1 is connected via a resistor R10 and a contact CT1 of the relay RL to the terminal UC+.

The resistor R2 is connected via a contact CT3 of the relay RL to the terminal UC−. A diode D3 placed across the terminals of the emitter-collector junction of the transistor T1 protects said transistor against excessive back-emf from the relay winding.

The operation of the device is exactly the same as that in the preceding examples. When the transistor T1 is conductive, the contacts of the relay RL close and the resistor R2 increases the bias of the transistor T1. The batteries are charged in parallel via the contact CT1 and the resistor R10 for BT1 and via the contact CT2 and the resistor R9 for BT2. Turning off the transistor T1 opens the contacts and the batteries discharge in series into the load.

It can be an advantage to connect several assemblies in accordance with the invention in parallel with the terminals of the load and of the charger.

FIGS. 4 to 7 illustrate four embodiments of a variant in which a switch is in series with the diode.

Figure 4:
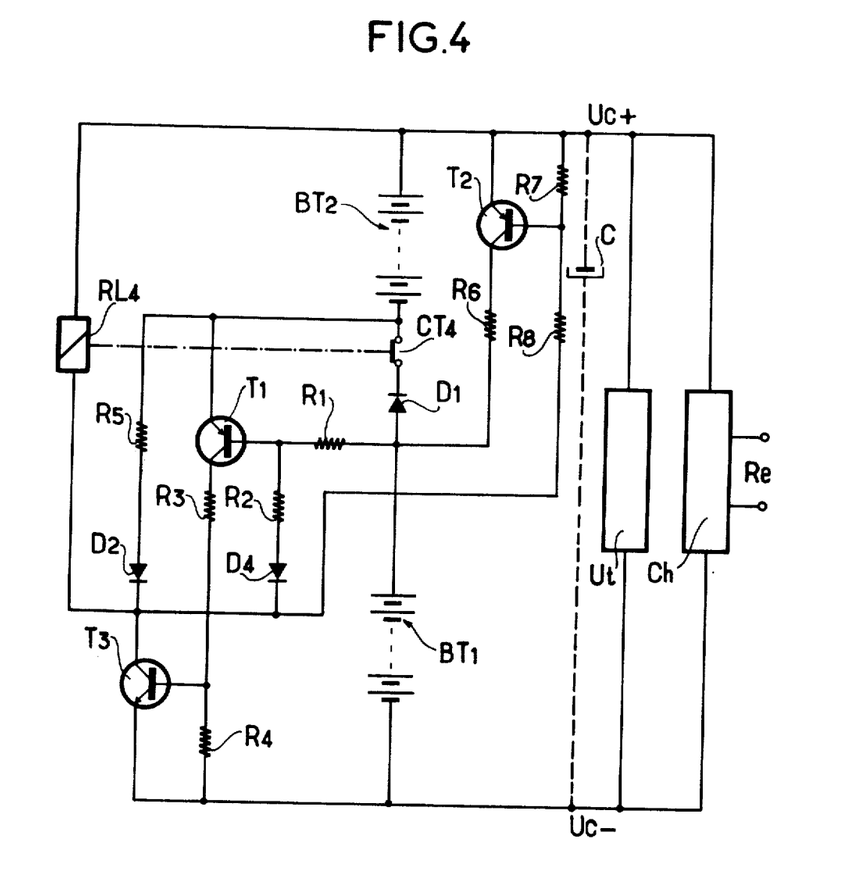
FIGS. 4 to 7 illustrate four embodiments of a variant of the arrangement which allow the value of the charging voltage to be increased.

The circuit of FIG. 4 is substantially the same as that of FIG. 1 except for the following modifications:

a relay RL4 has its excitation winding connected between the positive terminal UC+ and the cathode of the diode D2 and relay contacts CT4 are placed in series with the negative pole of the battery BT2 and with the diode D1; and a diode D4 is placed in series with the resistor R2, its cathode being connected to the cathode of the diode D1.

The relay RL4 is such that when its winding is not excited, the contact CT4 is closed.

The circuit operates as follows: when the charger is not operating, the batteries discharge in the load, the transistors T1, T2 and T3 being off, the contact CT4 being closed; when the charger is turned on, the reverse voltage at the terminals of the diode D1 biasses the transistor T1 via the resistor R1, the transistor T1 becoming conductive and controlling the transistor T3 which, via the current flowing through R8, controls the transistor T2. The batteries are then charged in parallel. A current flows through the winding of the relay RL4 which causes the contacts CT4 to open. The batteries can thus be charged at a voltage which is higher than that which is possible in the circuit diagrams of FIGS. 1 to 3.

Indeed, providing a judicious value is chosen for R2 and providing a diode is inserted in series between R2 and the collector of T3, a voltage of up to 3 volts can be obtained between the positive pole of BT1 and the negative pole of BT2 before the transistor T1 turns off.

In the previously given example, a charging voltage of up to 8.5 V (instead of about 6.9 V) per battery can be obtained.

Figure 5:
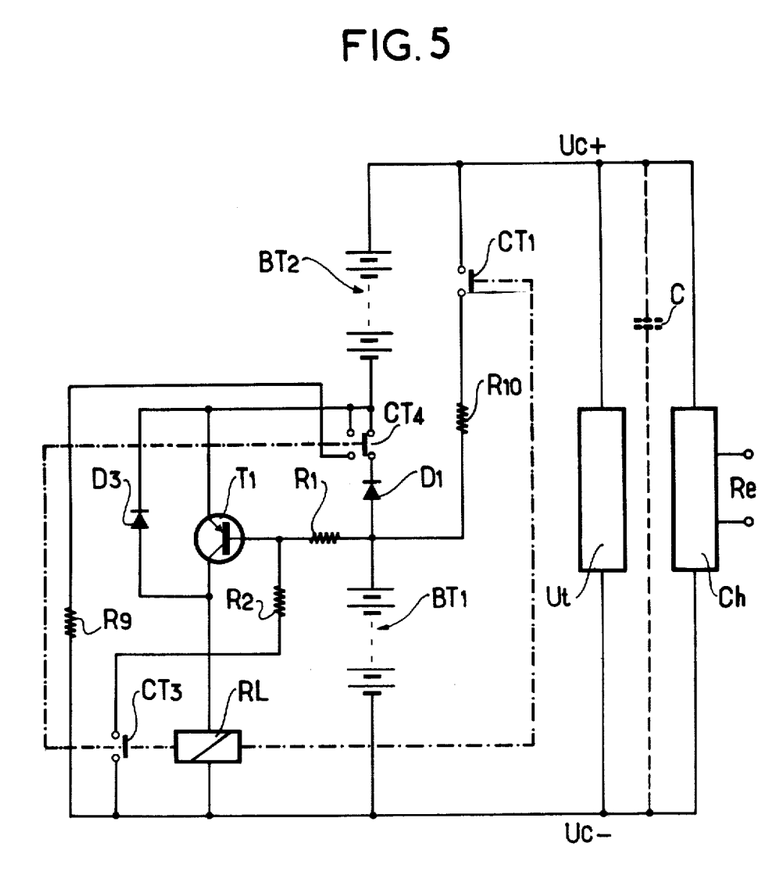

FIG. 5 illustrates a variant of the device in which the transistors T2 and T3 are replaced respectively by the contacts CT1 and CT3 of a relay RL connected between the collector of the transistor R1 and a terminal VC. The resistor R2 is connected to a contact CT3 of the same relay. The contact CT4 of the circuit in FIG. 1 is controlled by the same relay RL. When there is no current in the relay RL, the contact CT4 connects the two batteries in series via the diode D1 while the contacts CT1 and CT3 are open.

At the time of switching which makes the batteries change from the discharge state to the charge state, the transistor T1 is conductive; its collector feeds the relay and this connects the batteries in parallel. The contact CT4 then connects the—pole of BT2 to the—terminal UC− via a resistor 9. The relay versions of FIG. 4 and FIG. 5 do not provide instant switching but rather they introduce a short delay. Said delay aims to set the batteries in the discharge state. To prevent any power cut to the load Ut, the output capacitance of the charger must be sufficient to bridge the delay and may be increased by means of a capacitor 6 in parallel with its terminals, said capacitor being shown by dashed lines in FIGS. 4 and 5.

Figure 6:
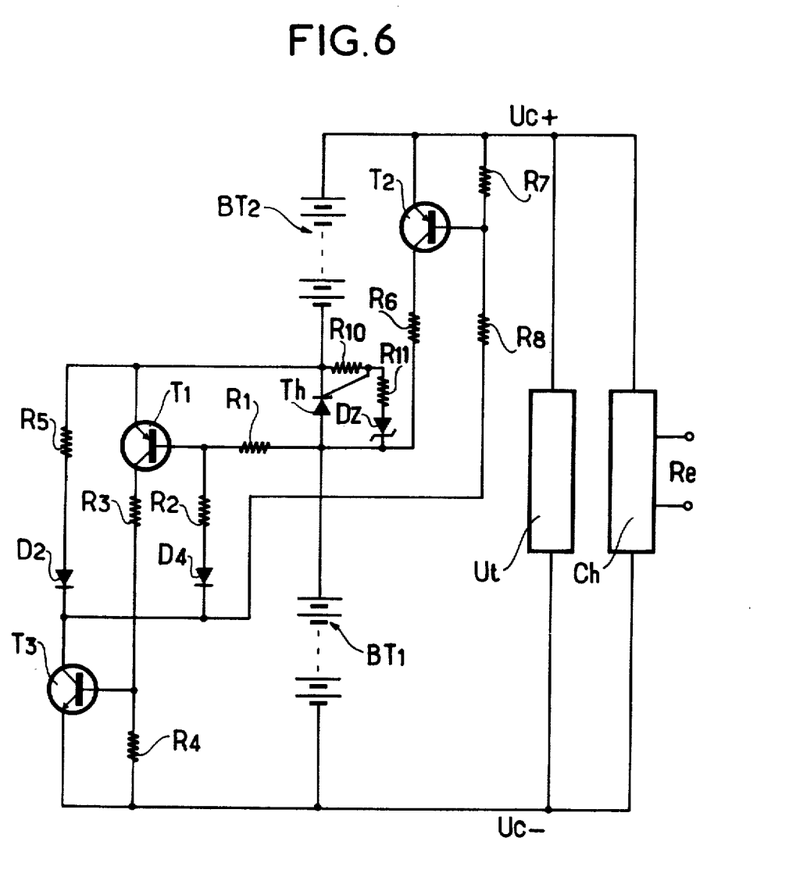

In the variant illustrated in FIG. 6, the circuit diagram is identical to that in FIG. 4, with the exception of the relay RL4, the contact CT4 and the diode D4 which are omitted. The diode is replaced by a thyristor Th whose trigger electrode is connected to the point which is common to two resistors R10 and R11 of a circuit connected in series across the terminals of the thyristor, said series connection further including a Zener diode DZ.

The thyristor is naturally turned off when a reverse voltage appears across its terminals to start charging. It conducts again only when the charging voltage is removed while a load is connected to the terminals $+U_c$ and $-U_c$ and once a given threshold voltage is applied to its trigger electrode by the Zener diode. Firing is very rapid; no interruption is observed on charging being interrupted.

One disadvantage of the thyristor is that it can become de-energized if the load current is too low. That is why the circuit in FIG. 6 is not recommended for loads with a very variable current (e.g. with a minimum current of less than 1/10th normal current), since there is a danger of producing relaxation oscillations.

Figure 7:
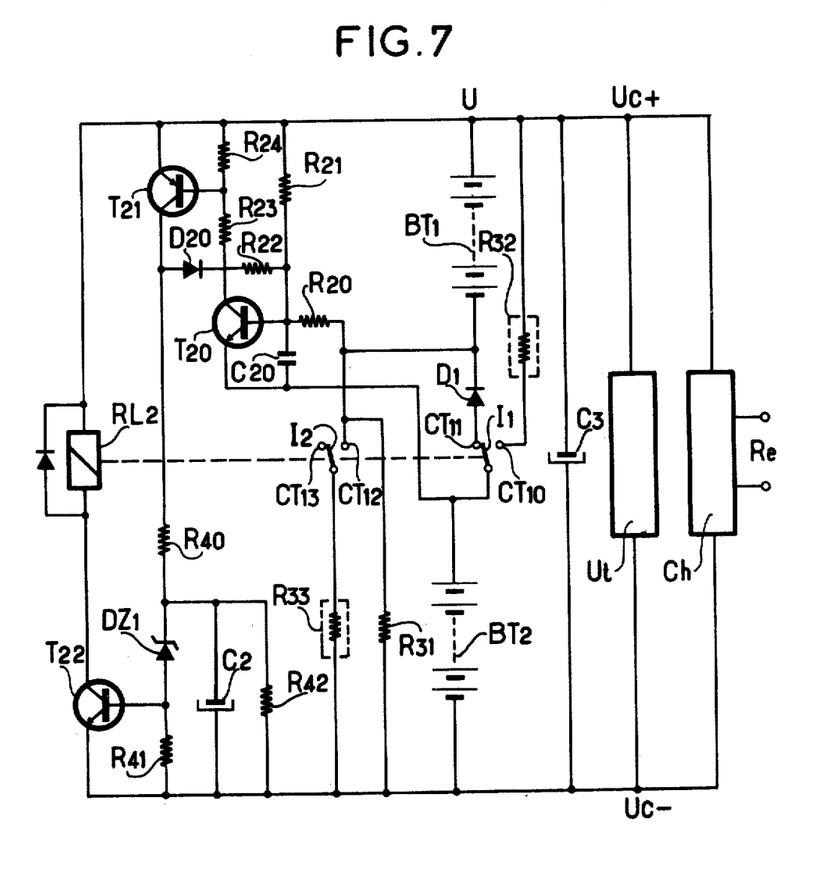

FIG. 7 illustrates a variant of the battery switching device. In the circuit of FIG. 7 the components which are common to the other figures, namely the storage batteries BT1 and BT2, the terminals $U_c+$ and $U_c-$, the load Ut, the charger Ch and the mains Rc, are designated by the same references as in the preceding figures.

The charging circuit switching components which allow the storage batteries to be switched from the series circuit (discharge) to the parallel circuit (charge) and vice-versa include a first changeover switch I1 which has a pair of contacts CT10 and CT11 and a second changeover switch I2 which has a pair of contacts CT12 and CT13, the changeover switches being controlled by a common relay which has a winding RL2. When the batteries are at rest or when they discharge into a load, the contacts are in the position shown in the figure and connect the batteries in series.

An NPN transistor T20 detects the voltage at the terminals of the diode D1. The base of the transistor T20 is connected: to CT2 and to the negative pole of BT1 via a resistor R20; to the positive pole of BT2 by a capacitor C20; to the terminal $U_c+$ by a resistor 21; and to the collector of a PNP transistor T21 by a resistor R22 and a diode D20.

The emitter of a transistor T20 is connected to the positive pole of the battery BT2. Lastly, the collector of the transistor T20 is connected to the UCT terminal via two resistors R23 and R24 in series. A transistor T21 is connected to the point which is common to these resistors.

The contact CT 12 is connected to the terminal $U_c-$ by a resistor R31.

The contact CT 10 is connected to the terminal $U_c+$ by a resistor R32. The contact CT 13 is connected to the terminal $U_c-$ by a resistor R33.

The winding RL2 of the contact control relay is disposed in series with an NPN transistor T22; the assembly thus formed is in parallel with the terminals $U_c+$ and $U_c-$. The base of the transistor T22 is biassed by a timing circuit which includes, in series with the collector of the transistor T21, resistors R40, R41 and a Zener diode DZ2 and, in parallel with DZ2 and R41, a capacitor C2 and a resistor R42.

The arrangement operates as follows:

When the battery is at rest or feeding a load, the configuration of the contacts is that shown in the figure, where the storage batteries are connected in series. All the transistors are turned off and the relay is not energized. The current in R31 is substantially equal to the current in R20 and R21 since R21 and R31 are equal and high with respect to R20. The low emitter voltage of the transistor T20 is close to zero when there is no load and negative if the load current is high. It will be observed that the battery discharge current is low due to the resistors R21 and R31: indeed, the value of R21 and R31 can be chosen sufficiently high for the current to be lower than the self-discharge current of the storage cells.

When a voltage is applied to the charger, the reverse voltage at the terminals of the diode D1 (whose threshold is determined by the ratio R20-R21) controls the transistor. The emitter current of T20 controls the conduction of the transistor T21 which ensures that the state of T20 is confirmed. After a time delay, the transistor T22 becomes conductive, the relay RL2 is energized and the contacts CT0 and CT12 are brought into service. The batteries BT1 and BT2 become charged respectively via the resistors R33 and R32.

If required by the load, a capacitor C3 can be placed at the output of the assembly to avoid any lack of load voltage while the relay operates when there is a power supply failure.

The circuit which has just been described with reference to FIG. 7 makes it possible to charge the batteries efficiently even if the sum of the battery voltages is very much higher than the voltage of the charger when said charger discharges into the batteries. As in the circuit of FIGS. 4 and 5, a contact in series with the diode D1 is opened. However, another advantage is that the presence of charger voltage is confirmed when the batteries are connected to the charger and before the relay switches over (due to the time delay circuit of the transistor T22 which is itself controlled by the confirmation circuit D20, R22, T21).

The above circuit makes it possible to use chargers whose voltage drop is high when they discharge a high charging current.

We claim:

1. An automatic switching arrangement for connecting two batteries in parallel between a pair of power supply leads for charging and in series between the same power supply rails for discharging to supply power thereto in the event of a failure of a power supply to the said leads, the switching arrangement comprising:

positive and negative terminals for respective connection to said power supply leads;

first and second storage batteries, the negative pole of the first battery being connected to the negative terminal and the positive pole of the second battery being connected to the positive terminal;

first and second switchable charging circuits, the first switchable charging circuit being connected between the positive pole of the first battery and the positive terminal, and the second switchable charging circuit being connected between the negative pole of the second battery and the negative terminal;

unidirectionally conductive means connected in series between the positive pole of the first battery and the negative pole of the second battery in order to allow a discharge current to flow in series through the batteries but to prevent a charging current from flowing in series through the batteries; and control means arranged to switch on said first and second switchable charging circuits when there is sufficient externally applied voltage at the positive and negative terminals for the batteries to be charged therefrom, and to switch off said switchable charging circuits otherwise to enable the batteries to supply power in series to said positive and negative terminals;

the control means including a first transistor connected to be turned on and off by the direction of the potential difference between the positive pole of the first battery and the negative pole of the second battery, and positive feed-back means arranged to saturate the first transistor when it turns on.

2. An arrangement according to claim 1, wherein the first transistor is connected so as to be turned off when the batteries are discharging i.e. when the positive pole of the first battery is at a positive potential with respect to the negative pole of the second battery.

3. An arrangement according to claim 1, wherein the first switchable charging circuit includes a second transistor and that the second switchable charging circuit includes a third transistor.

4. An arrangement according to claim 3, wherein the second transistor is connected so as to be controlled by the third transistor.

5. An arrangement according to claim 1, wherein the first switchable charging circuit is constituted by a second transistor and the second switchable charging circuit is constituted by a timing unit.

6. An arrangement according to claim 5, wherein the timing unit is a counter.

7. An arrangement according to claim 4, wherein a diode is inserted in series in the second switchable charging circuit between a point connected to the positive feed-back means and a point connected to control the second transistor.

8. An arrangement according to claim 7, wherein the positive feed-back means is constituted by a resistor connected firstly to the control electrode of the first transistor and secondly to the negative terminal via the diode and the second switchable charging circuit.

9. An arrangement according to claim 1, wherein the first switchable charging circuit is constituted by first contacts of a relay whose energization is controlled by the first transistor and wherein the second switchable charging circuit is constituted by second contacts of said relay.

10. An arrangement according to claim 9, wherein the positive feed-back means is constituted by a resistor which is connected firstly to the control electrode of the first transistor and secondly to a terminal of the charging circuit via third contacts of said relay.

11. An arrangement according to claim 1, including switch means associated with said unidirectionally conductive means between the batteries, the switch means being controlled by means which cause it to open and therefore to interrupt the current through the unidirectionally conductive means when the batteries are being charged and which cause it to close, thereby re-establishing the current through the unidirectionally conductive means when the batteries are being discharged.

12. An automatic switching arrangement according to claim 11, wherein said switch means is constituted by relay contacts disposed in series between the negative pole of the second battery and the unidirectionally conductive means, the excitation winding of the relay being connected between the positive terminal and the negative terminal via one of the switchable charging circuits, the relay being arranged so that the said contacts are closed when its winding is not excited.

13. An automatic switching arrangement according to claim 11, wherein the first switchable charging circuit is constituted by first contacts of a relay whose excitation is controlled by the first transistor and wherein the second switchable charging circuit is constituted by second contacts of said relay, said switch means is constituted by third contacts of said relay which connects the batteries in series with the unidirectionally conductive means when the relay is not excited and which connects the negative pole of the second battery to the negative terminal when the relay is excited.

14. An automatic switching arrangement according to claim 11, wherein the unidirectionally conductive means and said switch means are constituted by a thyristor whose trigger electrode is connected to the point which is common to two resistors and which, with a Zener diode, constitute a series circuit disposed in parallel with the thyristor.

15. An automatic switching arrangement according to claim 11, wherein the switch means is constituted by contacts controlled by a relay which is itself controlled by the first transistor whose base is connected to the cathode of the unidirectionally conductive means by a first resistor, said relay actuating the switchable charging circuits via a terminal voltage verification circuit which includes a fourth transistor controlled by the first transistor and via a timing circuit which includes a fifth transistor in series with the winding of the relay, the base of the fourth transistor being connected to the fifth transistor by a Zener diode associated with an RC circuit, the state of the terminal voltage being verified by means of two resistors which are connected in series between respective ends of the said first resistor and respective ones of the positive and negative terminals.

* * * * *